United States Patent [19]

Knoll

[11] Patent Number: 4,679,044
[45] Date of Patent: Jul. 7, 1987

[54] ARRANGEMENT FOR ILLUMINATING PASSIVE DISPLAY

[75] Inventor: Peter Knoll, Ettlingen, Fed. Rep. of Germany

[73] Assignee: Robert Bosch GmbH, Stuttgart, Fed. Rep. of Germany

[21] Appl. No.: 627,745

[22] Filed: Jul. 5, 1984

[30] Foreign Application Priority Data

Sep. 2, 1983 [DE] Fed. Rep. of Germany ....... 3331724

[51] Int. Cl.4 .............................................. G09G 3/00
[52] U.S. Cl. .............................. 340/815.2; 340/815.12
[58] Field of Search ........... 340/815.31, 815.2, 815.12, 340/815.13, 815.14; 350/345

[56] References Cited

U.S. PATENT DOCUMENTS 3,553,666 1/1971 Melone ............................ 340/815.31
4,045,794 8/1977 Ohta ................................ 340/815.31
4,118,110 10/1978 Saurer et al. ........................ 350/345
4,126,383 11/1978 Doriguzzi et al. .................. 350/345
4,196,581 4/1980 Nemoto ............................... 350/345
4,365,869 12/1982 Hareng et al. ....................... 350/345

FOREIGN PATENT DOCUMENTS 3145127 9/1982 Fed. Rep. of Germany.
3117783 11/1982 Fed. Rep. of Germany.

Primary Examiner—Marshall M. Curtis
Attorney, Agent, or Firm—Michael J. Striker

[57] ABSTRACT

In a device for the illumination of a passive display element a flat light guide element made of plexiglass is arranged immediately behind the passive display element. The guide element has a peripheral edge which is sloped. A carrier plate is provided in the device, which has light-emitting diodes in chip form mounted thereon. The light-emitting diodes apply light onto the peripheral edge of the light guide element.

5 Claims, 1 Drawing Figure

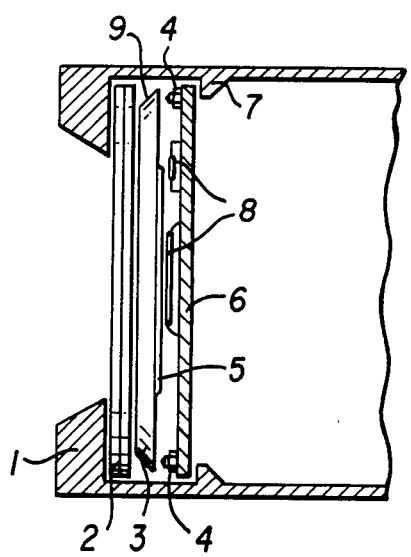

ARRANGEMENT FOR ILLUMINATING PASSIVE DISPLAY

BACKGROUND OF THE INVENTION

The present invention relates to a device for the illumination of a passive display element.

Various constructions of the devices for the illumination of passive display elements of the type under consideration have been known in the art. German patent publication DE-OS No. 31 45 127 discloses the device in which the passive display element is illuminated by direct through light. Although the known device is efficient this device requires a sufficient room, particularly in the direction of the depth of the device due to the fact that glow lamps utilized in this known device require relatively large space. It is also disadvantageous in the known device that such structural components as control blocks, are arranged only at the small peripheral portion in the region of the display element. This means that a complex path of the wiring from the display device is required.

A further device for the illumination of the passive display element has been described in German patent publication DE-OS No. 3,117,783. The light guide system in this known device is, however, relatively voluminous. Although fairly flat display elements are realizable the photoconductors available on the market have still relatively large width. This is particularly disturbing when a number of display elements should be accommodated in a narrow space. Finally, U-shaped light guide systems have been proposed. In such systems light emanated by a glow lamp is coupled via both arms of the light guide system from both sides of the field of visibility. The disadvantage of this system is a large volume of the photoconductive system resulted from the U-shaped design and also a large depth of the construction.

SUMMARY OF THE INVENTION

It is an object of the present invention to provide an improved arrangement for the illumination of the passive display element.

It is a further object of this invention to provide a specifically flat illumination system, which would not require high expenses for the manufacture of light guide systems.

These and other objects of the invention are attained by an arrangement for the illumination of a passive display element by means of light sources, comprising a light guide system through which light from the light sources is applied onto the passive display, said light guide system being flat and arranged behind said passive display elements, said light guide system being formed such that it has a uniform thickness over its total area, said light guide system having a peripheral edge which is sloped, and wherein at least two light sources are used, which are applied onto said light guide system in the region of said peripheral edge.

The light sources may be formed by light-emitting diodes, which is specifically advantageous. Light-emitting diodes are so-called cold light sources having a small current consumption and can be made extremely compact. A further advantage is a long service life of the light-emitting diodes as well as the maintenance of colour temperature during the dimming of the light emitting diodes.

It is particularly advantageous that the light-emitting diodes may be formed in chip form, and a carrier plate may be arranged immediately behind the photoconductor; the light-emitting diodes may be mounted on said carrier plate.

The carrier plate can be at the same time a carrier for integrated control blocks or similar structural components.

The arrangement may further include a housing accommodating said passive display element, said photoconductor and said carrier plate, said housing having inwardly extended projections, said photoconductor and said carrier plate being supported behind said display element by said projections. Thereby, the securing of the whole arrangement is provided in the housing formed with the projections, into which the individual components are forced. Therefore, a simple assembly of the arrangement is provided.

The photoconductor has a backside; said backside may have an imprint applied thereon for decoupling light over a portion of the area of said backside.

In order to obtain a uniform light output over the entire area of the light guide system it is advantageous to vary the thickness or the density of the imprint.

The light sources may be arranged on said plate on an area thereof, which is not visible from outside. Due to such an arrangement a specifically simple distribution of the light of the light sources is provided.

The light guide system and the carrier plate may have substantially the same peripheral dimensions as said display element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The sole FIGURE of the drawing illustrates a partial sectional view through a device, in which an arrangement for illuminating a passive display element is employed.

DETAILED DESCRIPTION OF THE PREFERRED EMBODIMENT

Referring now to the drawing in detail, reference character 1 identifies a housing formed with an opening for a liquid crystal display 2. LCD element 2 is arranged directly behind the opening formed in the housing 1 and serves for displaying letters and numerals of the display system in the known fashion. Any other passive indicating devices can be arranged in housing 1 in place of the liquid crystal display 2.

LCD element 2 is arranged next to a light guide system or light pipe 3. The latter has at their peripheral edge sloped flanks 9 which are formed such that light beams impinged onto the bottoms of the flanks are reflected in the radial direction. The light guide system 3 is manufactured of plexiglass in a simple manner as a product of injection molding. An imprint 5 is applied to the backside of the light guide system 3, which imprint serves for decoupling or absorbing light in the region of the visible indication. This imprint can be made homogeneous in the simple fashion. To obtain a uniform light density distribution it is expedient to form the imprint 5 so that light absorption be uniform over its entire area. The imprint 5 is therefore applied a little stronger in the region of a greater light density than in the region of a smaller light density.

Plate 6, formed preferably of ceramic material, is positioned next to light guide system 3. Plate 6 has a printed circuit thereon. Light-emitting diodes (LED) 4 and control elements 8 are applied to the circuit of plate 6. The connection of plate 6 with LCD 2 is obtained by means of conductive rubber elements not shown herein. Light for the indication element LCD is generated by light-emitting diodes 4. The number of the light-emitting diodes can be selected for each individual application of the present invention. For smaller display elements two light-emitting diodes are sufficient, which diodes are applied onto the respective ends of the display element. Larger display or indication members require more light-emitting diodes which should be uniformly distributed over the periphery of the indication member.

Light-emitting diodes 4, which are available in chip form, are soldered to the ceramic substrate of plate 6; the application of control block 8 and other structural components can be made by a similar operation.

The utilization of light-emitting diodes has the advantages that they have an extremely long service life, that the changes in colour temperature during the dimming-out process do not occur, and that their power consumption is insignificant.

The control voltage in the case of the utilization of the light-emitting diodes is small and it is easily supplied via a voltage divider from a voltage supply source. By the utilization of the light-emitting diodes of various colors easy color-switchings or color-changings are possible. The whole device including LCD-display element, light guide system 3 and plate 6 with light-emitting diodes 4 is held in the housing by means of inwardly extended projections 7 formed in housing 1. Projections 7 are formed so that after the manufacture of individual component parts they can be slightly pressed into housing 1. Housing 1 itself also serves as a supporting point. Due to the arrangement according to the present invention a specifically flat illumination system for LCD elements is possible, which is particularly suitable for the illumination of dashboards of motor vehicles or watches. With the intermediate-size indication system the thickness of 4 mm is realizable. Since the structural components have simple geometric shapes all these components are easy to manufacture. The simple construction can be favorably designed.

It will be understood that each of the elements described above, or two or more together, may also find a useful application in other types of illumination arrangements for illuminating passive display systems differing from the types described above.

While the invention has been illustrated and described as embodied in an illuminating device for illuminating a passive display element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for illumination of a passive display element by means of light sources, comprising a housing having an opening displaying said passive display element; a light guide system through which light from the light sources is applied onto the passive display element, said light guide system being flat, said light guide system being formed as a plat having a uniform thickness over its total area and a backside facing said light sources and provided with an imprint applied thereon for decoupling light over a portion of the area of said backside, said plate having a peripheral edge which is sloped, and wherein at least two light source are used, which are light-emitting diodes each formed as a Chip-LED the light output from which is coupled immediately into said light guide system in the region of said peripheral edge; and a carrier plate, said light-emitting diodes being mounted on said carrier plate, said housing accommodating said passive display element, said system and said carrier plate, said housing having inwardly extended projections spaced from each other to support therebetween said passive display element, said light guide system and said carrier plate which are respectively positioned and retained in that order by said projections so that a compact and flat display cell is formed.

2. The arrangement as defined in claim 1, wherein said carrier plate is made from ceramic material, said guides being soldered to said carrier plate.

3. The arrangement as defined in claim 1, further including control elements mounted on said carrier plate.

4. The arrangement as defined in claim 1, wherein said light-emitting diodes are arranged on said plate on an area thereof, which is not visible from outside.

5. The arrangement as defined in claim 1, wherein said light guide system and said carrier plate having substantially the same peripheral dimensions as said display element.

* * * * *